United States Patent [19]

Jones

[11] 4,037,412

[45] July 26, 1977

[54] COMPOUND SPARK-IGNITION AND DIESEL ENGINE

[75] Inventor: Charles Jones, Hillsdale, N.J.

[73] Assignee: Curtiss-Wright Corporation, Wood-Ridge, N.J.

[21] Appl. No.: 621,234

[22] Filed: Oct. 9, 1975

[51] Int. Cl.² ............ F02B 33/44; F02B 33/42; F02B 69/00; F02B 53/04

[52] U.S. Cl. .............................. 60/605; 123/8.05; 123/8.11; 123/21; 123/119 C; 123/139 AP

[58] Field of Search ............ 60/598, 601, 605, 606, 60/607, 608, 609, 610, 611, 612; 123/21, 32 SW, 139 AP, 139 AQ, 119 C, 8.05, 8.09, 8.11, 179 BG, DIG. 1, DIG. 7, 119 CB, 119 CD, 119 CE, 119 CF, 119 CG, 119 CA

[56] References Cited

U.S. PATENT DOCUMENTS

| | | | |
|---|---|---|---|
| 3,228,183 | 1/1966 | Feller | 123/8.05 |
| 3,606,873 | 9/1971 | Rademacher et al. | 123/179 BG |
| 3,698,364 | 10/1972 | Jones | 123/8.09 |

*Primary Examiner*—Carlton R. Croyle
*Assistant Examiner*—Leonard Smith
*Attorney, Agent, or Firm*—Victor D. Behn; Arthur Frederick

[57] ABSTRACT

A supercharged rotary combustion engine which at low operating speeds and/or power functions as a spark-ignited, Otto cycle, engine which at higher speeds and/or power functions as a diesel engine.

10 Claims, 6 Drawing Figures

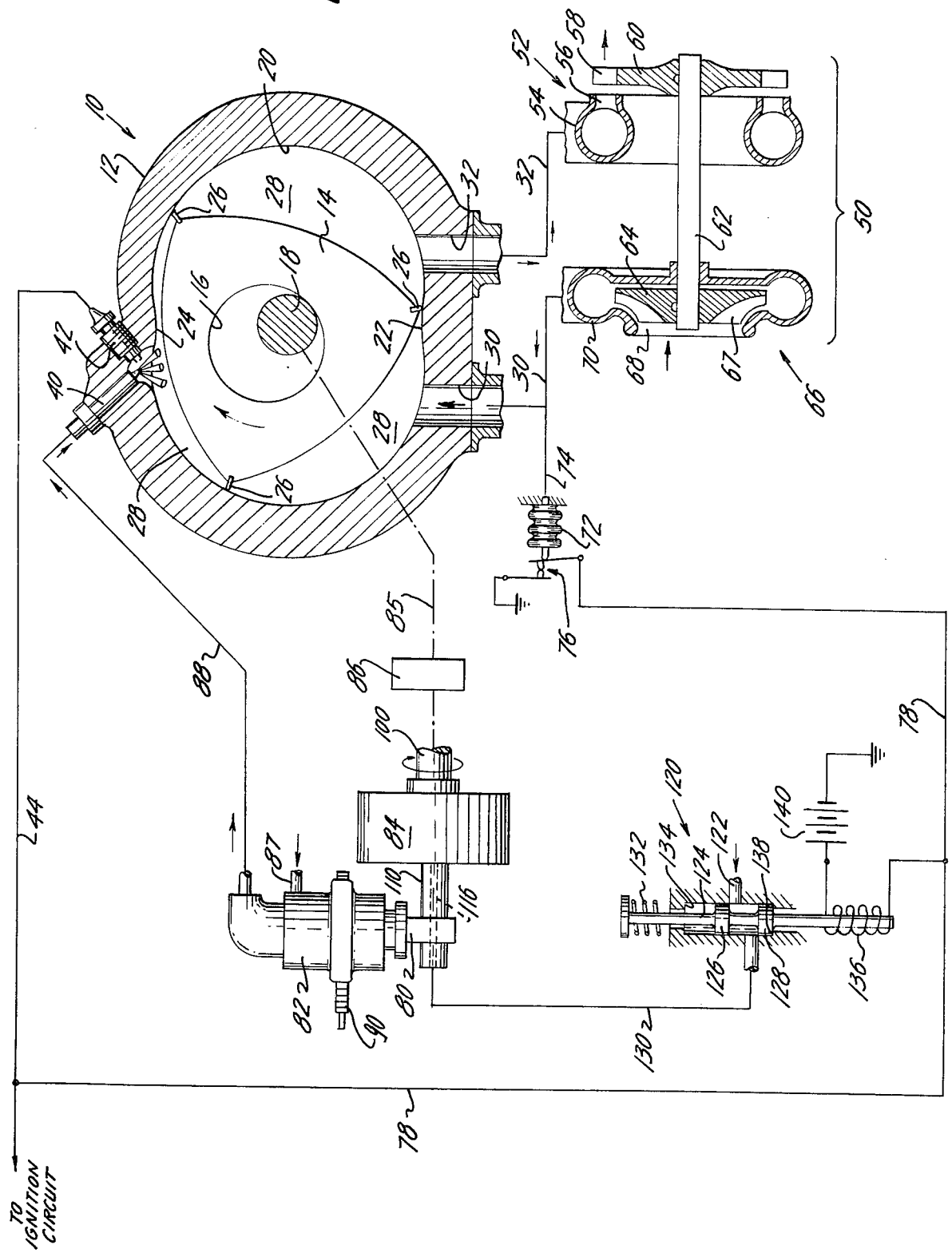

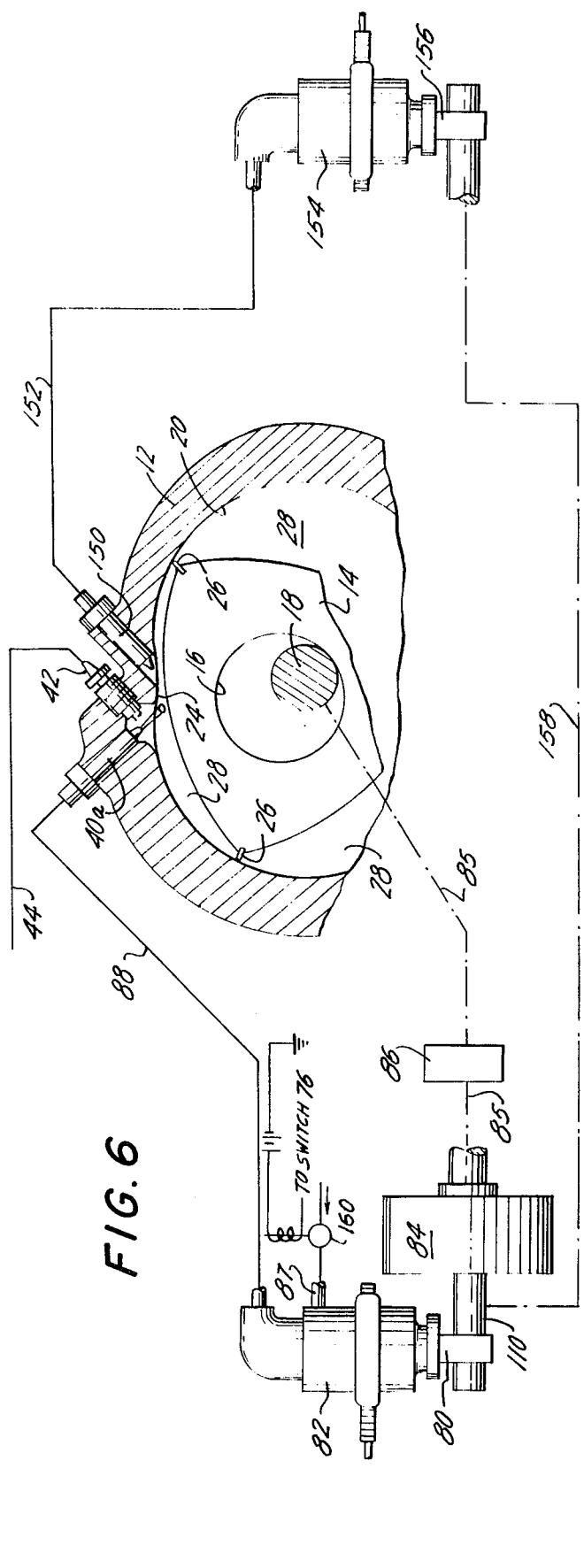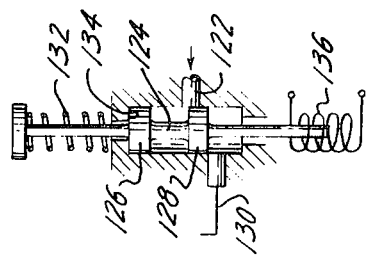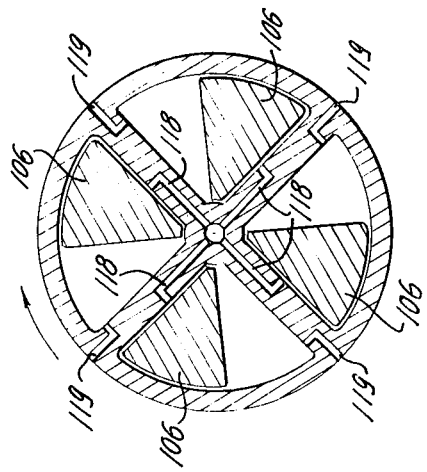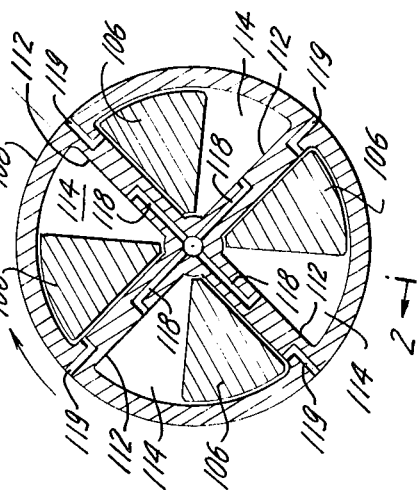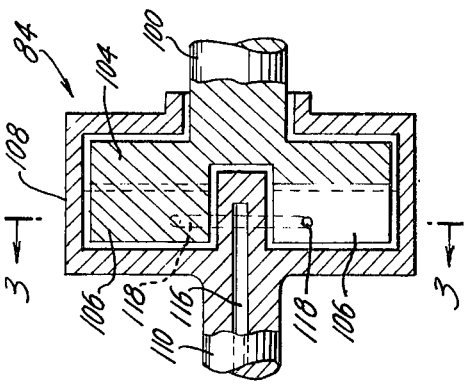

COMPOUND SPARK-IGNITION AND DIESEL ENGINE

BACKGROUND OF INVENTION

The invention relates to internal combustion engines, particularly of the rotary type such as disclosed in U.S. Pat. No. 2,988,065 granted June 13, 1961 to Wankel et al and more particularly to stratified-charge rotary combustion engines having high pressure fuel injection such as disclosed in U.S. Pat. No. 3,246,636 granted Apr. 19, 1966 to Bentele and U.S. Pat. No. 3,894,518 granted July 15, 1975 to Gavrun et al and which are capable of operating as A spark-ignition engine on diesel-type (low octane) fuels. Such stratified charge rotary engines have an unthrottled air intake and therefore operate with a large quantity of excess air. As a result, the Bentele and Gavrun et al stratified charge rotary engines have high thermal efficiencies and low hydrocarbon exhaust emissions. This is particularly true at engine power outputs below the high power range of the engine. Thus, when such an engine is operated, for example, at full power, the fuel must be distributed over the entire combustion chamber in order for all of the fuel to mix with air so as to achieve complete combustion. Hence, at high engine power outputs of such a stratified charge engine, the resulting combustion is essentially as in a carbureted engine with its attendant lower thermal efficiencies and high exhaust emissions. At lower engine powers, however, the fuel can be confined to and burn in a mid-portion of each combustion chamber where it is substantially enveloped by the excess air whereby complete combustion is achieved while at the same time this enveloping excess air minimizes combustion heat loss to the combustion chamber walls thereby providing high thermal efficiencies. Also, in such stratified charge rotary engines, particularly of the type shown in the Bentele patent, difficulty has been experienced in obtaining completely acceptable ignition firing regularity over the entire operating range of the engine.

Diesel-type operation of an internal combustion engine requires compression ratios of the order of magnitude of 15:1. Compression ratios of this magnitude are difficult to achieve in rotary engines of the type disclosed in the aforementioned patents.

As described in said Wankel et al patent, such engines have a multi-lobe cavity which preferably has an epitrochoidal profile. The shape of this epitrochoidal engine cavity determines the compression ratio. Thus, an epitrochiod having a smaller ratio of $a/b$ has a larger compression ratio, where $a$ is equal to one-half the length of the major axis of the epitrochoid and $b$ is equal to one-half the length of its minor axis. Today it is more common to describe the shape of this epitrochoid in terms of a so-called K factor which is equal to the ratio of $R/e$ where R is the radial distance from the center of the rotor to the tip of its apex seals and $e$ is the distance between the rotor center and engine axis. In general, the magnitude of the K factor increases as the ratio $a/b$ decreases. Hence, for higher compression, a rotary engine of the type shown in said Wankel et al patent should have a high K factor.

As is evident from the disclosure of said Wankel et al patent, at high compression ratios, the shape of each engine working chamber at its top dead center position becomes extremely thin in a radial direction and, therefore, combustion in the working chambers is subject to severe cooling or chilling by the walls of the chamber. For this reason it is difficult to make a successful diesel-type rotary combustion engine of the type disclosed in the Wankel et al patent simply by changing the engine K factor to increase the engine compression ratio, for example, to about 15:1.

Diesel-type rotary combustion engines have been designed with a supercharger for providing the necessary pressures for compression ignition, that is, diesel operation, whereby the volumetric compression ratio of the main engine (apart from the supercharger) can be substantially less than that required for diesel operation. U.S. Pat. No. 3,228,183 granted Jan. 11, 1966 to Feller and U.S. Pat. No. 3,405,692 granted Oct. 15, 1968 to Paschke are examples of such a compound diesel engine. In both these prior art diesel engines the supercharger is a positive-displacement type supercharger which is driven from the engine shaft. With such a compound engine, the overall volumetric compression ratio of the engine is essentially the same throughout the operating range of the engine. Such a compund engine can therefore operate as a diesel throughout the operating range of the engine. For example, if the compression ratio of the supercharger is made equal to 2:1 and that of the main engine is made equal to 8:1, then the overall compression ratio becomes equal to 16:1 which is sufficient for diesel operation.

In order to further improve the efficiency of these prior art diesel engines, they are also provided with an expander to utilize some of the energy otherwise lost in the engine exhaust gases. If, as in the Feller patent (FIG. 1) or Paschke (FIG. 3), the supercharger and expander are combined into a common unit, then the relative positions of the porting connections of the supercharger and expander with the main engine unit involve compromises which necessarily reduce the overall engine efficiency. On the other hand, if separate compressor and expander units are used with each drivably connected to the engine shaft, as it also shown in the Feller (FIG. 10) and Paschke (FIG. 6) patents, then the complexity and size of the compound engine are increased as a result of using two such units, each with its geared connection to the engine shaft.

SUMMARY OF INVENTION

An object of the present invention resides in the provision of a novel and improved supercharged rotary combustion engine capable of low power stratified charge operation without the aforementioned problems associated with the Bentele and Gavrun et al stratified charge engines and capable of diesel-type operation without the aforementioned problems associated with prior art rotary compound engines of this type.

In accordance with the invention, a high pressure fuel injection, stratified-charge rotary combustion engine (for example of the type shown in aforementioned U.S. Pat. Nos. 3,246,636 and 3,894,518) having a volumetric compression ratio (for example, about 8:1 or 10:1) substantially below that required for diesel operation and designed for operation on low octane or diesel-type fuels, is provided with a supercharger driven by the engine exhaust gases (turbo-supercharger), the supercharger being capable, at the higher engine power outputs, of increasing the overall volumetric compression ratio, for example to 15:1, sufficient for diesel operation. With this combustion, at low engine power outputs the engine is operated as a stratified-charge, spark-ignited engine while at high power outputs of the engine, it is operated as a diesel engine, that is, with compression-ignition, all on diesel-type fuel. This combination thereby minimizes the above-mentioned problem of operating a high pressure stratified-charge engine over the entire engine operating range and of the lower efficiency of such an engine at the high end of its power range. At the same time even though the rotary engine itself has a compression insufficient for diesel operation, the turbo-supercharger increases the compression ratio sufficiently for diesel-type operation over the major or high power operating range of the engine. This combination thereby provides the inherent high efficiency of a diesel engine over the major operating range of the engine and, in addition, the turbo-supercharger, by utilizing the otherwise waste energy of the engine exhaust gases, further improves the overall engine efficiency. This result is accomplished without the aforementioned complexity and problems associated with the Feller and Paschke patents which require an engine driven, positive-displacement supercharger as well as an exhaust gas expander to produce a similar result.

It is therefore a further object of the invention to provide a turbo-supercharged rotary engine in which the engine operates on diesel-type fuel as a stratified-charge, spark-ignited engine in a low power output range of the engine and as a compression-ignition or diesel engine at higher engine power outputs. Accordingly, with the present invention the engine can be operated as a diesel over a major portion of its operating range. The turbo-supercharged engine of the present invention thereby has a further advantage of being easier to start than an engine which operates as a diesel over its entire operating range. This is so because by operating the engine of the present invention as a spark-ignited engine at the lower power range, more positive starting ignition is provided as opposed to the difficulty of the diesel engine in achieving self-ignition pressures and temperatures at the low rotative speeds developed by conventional starting motors. This is particularly so in starting a diesel when the engine is cold. The known large starting power requirements of a diesel, necessitated by the substantially higher compression pressures and therefore larger starting torque, is not necessary with the supercharged engine of this invention. Therefore, even with significantly smaller starter motors, the starting ability of the engine of this invention, particularly under cold ambient conditions, is considerably improved over a diesel.

In order to further improve the overall efficiency of the engine, with the present invention the spark-ignition system is disabled when the engine is operating as a diesel. In addition, because of the larger time lag required to initiate combustion by compression-ignition as compared to spark-ignition, in accordance with the invention the timing of the high pressure fuel injection is sharply advanced when the ignition system is disabled.

Other objects of the invention will become apparent upon reading the following detailed description in connection with the drawings.

BRIEF DESCRIPTION OF THE DRAWINGS

FIG. 1 is a schematic view of a compound rotary engine embodying the invention;

FIG. 2 is a sectional view taken along line 2—2 of FIG. 3 of an adjustable shaft coupling in the fuel pump drive, FIG. 3 is a sectional view taken along line 2—2 of FIG. 2 showing an advance position of the coupling output, FIG. 4 is a view similar to FIG. 3 but also showing the fuel pump drive coupling in a retarded position, FIG. 5 is a partial view of the control valve shown in FIG. 1 but showing the valve in its opposite extreme position, and FIG. 6 is a partial view showing a modified form of fuel injection system.

DESCRIPTION OF PREFERRED EMBODIMENTS

Referring first to FIG. 1 of the drawing, a rotary engine, schematically indicated at 10, is generally similar to that shown in aforementioned patent to Bentele. Thus, the engine comprises an outer body or housing 12 having a cavity therein within which an inner body or rotor 14 is mounted for relative rotation. The rotor 14 is journaled on an eccentric portion 16 of a shaft 18 which extends coaxially through the housing 12.

The peripheral inner surface 20 of the housing 12 has a multilobe profile which, as illustrated, has two lobes and which preferably is basically an epitrochoid. The two lobes of the trochoid surface 20 join at junctions 22 and 24. The rotor 14 has a generally triangular profile with its apex portions having seals 26 providing sealing cooperation with the trochoid surface 20 to form three working chambers 28.

The housing 12 has an air intake passage 30 for supplying an air intake charge to the working chambers 28 and an exhaust passage 32 for discharge of combustion gases from said chambers. In addition, the housing 12 is provided with a fuel nozzle 40 for supplying fuel into the working chambers after the air intake charge in each chamber has been substantially compressed. Thus, with the rotor 14 in the position of FIG. 1, fuel is being discharged from the nozzle 40 into the upper (as viewed in FIG. 1) of the working chambers 28. A suitable igniter such as a spark plug 42 is disposed with its electrodes positioned adjacent to the discharge end of the nozzle 40 preferably so that said nozzle discharge end and the spark plug electrodes both open through the trochoidal surface 20 through a common recess in said trochoidal surface and so that at least a portion of the fuel vapor produced by the fuel spray pattern passes in close proximity to the electrodes of the spark plug 42 for prompt ignition as the fuel discharges from the nozzle 40. The spark plug 42 is controlled by an ignition circuit (not shown) which is connected to the plug by a wire 44. The timing of the ignition circuit is such that the plug fires while fuel is discharging from the nozzle 40 in order to promptly ignite this fuel. The ignition circuit is conventional and may, for example, be similar to that shown in the aforementioned Gavrun et al patent in which the spark plug firing is controlled by a cam driven from the engine shaft 18. The nozzle 40 preferably has a plurality of discharge openings to provide a shower-head type of fuel spray pattern.

The engine 10 also includes suitable gearing (not illustrated) between the rotor 14 and the engine housing to control relative rotation of the rotor. In addition, the rotor 14 is provided with suitable side seals to complete the seal grid around each working chamber 28. Such gears and seals are conventional and may, for example, be as illustrated in the Bentele patent.

With an engine 10, as has been described, during engine operation and with the rotor rotating clockwise as viewed in FIG. 1, the volume of each working chamber 28 periodically increases from a minimum volume condition when it is located adjacent to the lobe junction 22 and opens to the intake passage 30, to a maximum volume condition and then said chamber compresses its intake charge until the working chamber again reaches a minimum volume condition, but this time adjacent to the lobe junction 24. Thereafter, the volume of said chamber again expands to a maximum volume and then decreases to a minimum volume as the chamber comes into communication with the exhaust port 32 at the lobe junction 22 to complete the cycle.

The geometry of the engine 10 is such that the volumetric compression ratio of its working chamber 28 is substantially less than that required for diesel operation, that is, compression-ignition. For example, this volumetric compression ratio may be of the order of 8:1 or 10:1 which is sufficient for spark-ignition type operation.

In accordance with the invention, the engine 10 is combined with a turbo-supercharger 50 to provide a compound engine. As illustrated, the turbo-supercharger consists of an axial-flow type turbine unit 52 having an annulus 54 to which the engine exhaust gases are supplied by the exhaust passage 32. The annulus 54 has a nozzle portion 56 for directing the exhaust gases against or between the blades 58 of a turbine rotor 60 for driving this rotor. The turbine rotor 60 is connected by a shaft 62 to the rotor 64 of a compressor unit 66, which is illustrated as being a centrifugal compressor. The compressor rotor 64 is provided with blades 67 for compressing air from its intake opening 68 to an annulus 70 from which compressed air is supplied to the engine working chambers by the air inlet passage 30.

Both the turbine unit 52 and the compressor unit 66 of the turbo-supercharger are conventional and the invention is not limited to any particular form of turbo-supercharger 50.

With such a rotary turbo-supercharged compound engine, at low engine power outputs the available energy in the exhaust gases of the engine is quite low and therefore the output pressure of the supercharger 66 is insufficient to raise the compression pressure achieved in each working chamber 28 to the point where diesel operation is possible. At higher engine power outputs, however, the turbo-supercharger is designed to produce an output pressure in the compressor outlet annulus 70 of at least 2 atmospheres. With such a 2:1 pressure rise produced by the supercharger, and with the working chambers having a volumetric compression ratio of 8:1 or 10:1, the overall compression ratio becomes at least 16:1 which is sufficient for diesel operation.

The engine 10 is a stratified charge rotary engine which is capable of operating on diesel or kerosene type fuels as a spark-ignited engine. Accordingly, even though the supercharger output pressure is insufficient for diesel operation at low engine powers, the engine 10 can operate as a spark-ignited engine at these low powers all without any change in the type of fuel or any change in the engine geometry. At the same time, a high overall thermal efficiency should be obtainable even at low engine powers as a result of using energy in the engine exhaust gases for driving the supercharger, and because of the relatively low heat loss to the combustion chamber walls that should exist in a stratified charge engine such as engine 10. This is so because the stratified engine 10 has an unthrottled air intake passage 30, and therefore the engine 10 operates with a very large quantity of excess air at low engine powers. This coupled with the fact that the fuel is burned promptly as it is introduced into each combustion chamber 28, combustion can be confined to a mid-region of each chamber 28 and therefore this combustion would be enveloped or surrounded by the excess air in each chamber 28 thereby minimizing heat transfer losses from the burning fuel to the walls of said chamber.

At the higher engine power outputs when the output pressure of the supercharger is sufficient for compression-ignition operation, the engine 10 functions as a diesel to further improve the engine thermal efficiency. Since the spark plug 42 is not essential during diesel operation, means preferably are provided to disable the plug 42 during such diesel operation. For this purpose a bellows 72 or other flexible diaphragm is connected to the supercharger output passage 30 by a line 74. The bellows 72 is arranged to close a switch 76 when the supercharger output pressure exceeds a predetermined value sufficient for compression-ignition (diesel operation) in each working chamber 28. When the switch 76 closes, as illustrated, the electrical wire connection 44 to the spark plug 42 is grounded through the closed swithc 76 by a wire 78, thereby disabling the ignition circuit. At low engine powers the bellows 72 contracts to open the switch 76 thereby restoring the effectiveness of the ignition circuit to the spark plug 42.

Obviously the circuit to the spark plug 42 could be disabled by opening the ignition circuit instead of by grounding it, as illustrated, or by in some other way disabling the ignition circuit so that the spark plug 42 does not fire when the overall engine compression ratio is sufficient for diesel-type operation. By disabling the ignition circuit at high engine powers, the energy otherwise required for ignition is saved and the durability of the ignition circuit is increased. Also, in lieu of using the supercharger output pressure for disabling the ignition circuit, some other factor (such as supercharger speed or pressure and/or temperature in each working chamber 28) could be used as a measure of the supercharger output or as a measure of the conditions in each working chamber so as to indicate when the supercharger output is sufficient for compression-ignition. The ignition circuit for the spark plug 42 should, of course, not be disabled before the compression and/or temperature rise conditions in each work chamber 28 are sufficient for compression ignition. To avoid premature disabling of the spark plug 42, it preferably is not disabled until somewhat after compression-ignition conditions have been attained in each working chamber 28.

By way of summary, the turbo-supercharged engine 10, 50 consists of a spark-ignited, stratified-charge, high-pressure fuel injection rotary engine 10 capable of operating on diesel type fuels even though the volumetric compression ratio of each working chamber is substantially less than that required for diesel (compression-ignition) operation, (said compression ratio preferably is about 8:1 or 10:1), in combination with a turbo-supercharger 50 such that at the higher engine powers the output pressure of the supercharger is sufficient to raise the engine compression to the point where it is high enough for diesel-type (compression-ignition) operation, whereupon the engine operates as a diesel with the high thermal efficiency accompanying diesel operation. Also, when the compression in each working chamber 28 of the engine is high enough for diesel operation, the ignition circuit to the spark plug 42 preferably is disabled. With this combination the compound engine 10, 50 can readily be operated on diesel-type fuels as a spark-ignited engine at low power and as a diesel at high power and at the same time the turbo-supercharger 50 utilizes energy otherwise wasted in the exhaust from the engine 10 to provide compound engine 10, 50 with high thermal efficiency.

In general the time delay between introduction of fuel from the nozzle 40 and actual combustion in a working chamber is substantially greater for compression-ignition (diesel-type operation) than it is for spark-ignition. For this reason the invention preferably also includes means for abruptly advancing the timing of fuel discharge from the nozzle 40 at about the same time that this ignition circuit is being disabled and the engine transfers from spark-ignition to diesel-type operation. For this latter purpose the drive connection for the cam 80 which activates the fuel pump 82 for supplying fuel to the nozzle 40 includes a coupling 84 connected to the engine shaft 18 by means schematically indicated at 85. The coupling 84 enables the cam 80 to be abruptly advanced or retarded, relative to the engine shaft 18, through an angle which for example, may be from 5° to 20°. This sudden or abrupt advance in the fuel injection timing provided by the coupling 84 is distinct from a progressive advance in fuel injection timing with engine speed and/or load as is quite common in diesel engines. Thus, the compound engine 10, 50 may also include conventional coupling means, schematically indicated at 86, and interposed, for example, in the drive connection 85 between the engine shaft 18 and the abrupt-change coupling 84, the coupling 86 serving to progressively advance the fuel injection from the fuel nozzle 40 with increase in engine power and/or speed. This progressive fuel timing control provided by the coupling 86 is desirable both when the engine is operating as a diesel as well as when the engine is operating as a spark-ignited engine.

The fuel pump 82 and its actuator cam 80 may be similar to that disclosed in the aforementioned Bentele and Gavrun et al patents. Thus, the fuel pump 82 receives low octane or diesel-type fuel from a line 87 and upon actuation by the cam 80 delivers a predetermined quantity of fuel via the line 88 to the fuel nozzle 40, the quantity of fuel being determined by the setting of the fuel pump control rack 90.

The details of the coupling 84 are schematically shown in FIGS. 2, 3 and 4. As there shown, the coupling includes an input or drive shaft 100 which is driven from the engine shaft 18 by the connection 85. The coupling shaft 100 includes a flange 104 having a plurality of circumferentially-spaced, axially-extending, coupling drive vanes 106. The flange 104 and drive vanes 106 are received within a hollow housing portion 108 secured to the output shaft 110 of the coupling 84. The housing portion 108 has circumferentially-spaced partitions 112 to form compartments 114 within which the drive vanes 106 are received. The coupling output shaft 110 has an axial passage 116 and radial branch passages 118 in each of the housing partitions 112 and terminating in the housing compartments 114 so as to control the pressure in the portion of each of said compartments on one side (clockwise as viewed in FIG. 3) of its drive vane 106. Each of the compartments is also provided with a vent passage 119 on its other circumferential side. The vanes 106 have a close sliding fit in the compartments 114 so as to hydraulically seal the portion of each of these compartments 114 on the one side (clockwise as viewed in FIG. 3) of the associated drive vane 106. If desired, the vanes 106 may be provided with seals (not shown) to better seal the compartments 114.

Returning now to FIG. 1, a valve 120 is provided so as to connect the coupling passages 116 and 118 to a source of hydraulic pressure 122 or to connect said passages to drain (e.g. to atmospheric pressure). As shown, the valve 120 consists of a spool-type member 124 having two spaced-apart land portions 126 and 128 and an output passage 130 communicating with the shaft passage 116, for example, at the end of said shaft. The valve member 124 is axially slidable within a cylindrical bore, the ends of which drain to a low pressure region, e.g., to atmospheric pressure. A spring 132 is provided for urging the valve member to one extreme position (that shown in FIG. 5) against a shoulder 134 at which position the valve output 130 is connected to a drain or atmospheric pressure through the lower end (as viewed in the drawing) of the valve bore. A solenoid winding 136 surrounds an extension of the valve member 124 so that when the solenoid 136 is energized the valve member 124 is pulled down against the spring 132 to the position illustrated in FIG. 1 against the shoulder 138. One end of the solenoid is connected to a source of electric power 140 and the other end to the wire 78 leading to the pressure controlled switch 76.

With the above described structure of the coupling 84 and valve 120, when the bellows 72 expands to close the switch 76 to disable the ignition circuit, this switch closure at the same time is effective to energize the solenoid 136 to pull the valve member 124 down against the shoulder 138 (as shown in FIG. 1) at which position of the valve 124 the input source of hydraulic pressure 122 is connected to the outlet line 130. This hydraulic pressure is transmitted through the shaft passage 116 to the radial passages 118 and into the coupling compartments 114 to cause the output shaft housing 108 to rotate ahead of coupling input shaft drive vanes 106 by an amount equal to the angle A. When, however, the switch 76 opens, the solenoid 136 is de-energized so that the spring is effective to move the valve 124 against the shoulder 134 to the position illustrated in FIG. 5 whereupon the input passage is now closed by the valve and the valve output passage 130 now communicates with the valve bore below the valve land portion 128 and therefore is connected to drain. Accordingly, the pressure in the coupling compartments 114 now drops to atmospheric pressure so that because of the torque required to drive the coupling output, the relative positions of the coupling drive vanes 106 and output partitions 112 drops back to that shown in FIG. 4. Thus, the coupling output shaft 110 is now retarded relative to its input shaft 100 by the angle A from its position of FIG. 3.

With the compound engine described, when the output pressure of the supercharger is above a predetermined value, sufficient so that the overall compression in each working chamber is high enough for diesel operation, the pressure switch 76 is closed and the solenoid 136 is energized. As described, closure of the pressure switch 76 disables the ignition circuit. Also, as described, energization of the solenoid is effective to pressurize the coupling 84 to advance the position of the fuel pump cam 80 relative to the engine shaft 18 by the angle A. Accordingly, the engine now operates as a diesel with advanced timing of the fuel pump. When, however, the output pressure of the supercharger drops below said predetermined value, the pressure switch 76 now opens to restore the effectiveness of the ignition circuit to the spark plug. At the same time the solenoid is de-energized so that coupling 84 is de-pressurized whereupon the timing of the fuel pump cam 80 is retarded from its advance position by the angle A. The engine now operates as a stratified-charge, spark-ignited engine without any other change and with the same fuel.

FIG. 6 illustrates a modified form of the compound engine of the invention in which the engine includes two fuel nozzles 40a and 150 disposed in the engine housing, as in the aforementioned Gavrun et al patent. For ease of understanding, the parts of FIG. 6 and the corresponding parts of FIG. 1 have been designated by the same reference numerals.

The fuel nozzle 40a is positioned similar to the fuel nozzle 40 of FIG. 1. Thus, the discharge end of the fuel nozzle 40a and the electrodes of the spark plug 42 both open through the trochoidal surface 20 through a common recess in said surface. Unlike the fuel nozzle 40, the fuel nozzle 40a preferably has only a single spray orifice. However, like the fuel nozzle 40, at least a portion of the fuel vapor produced by the fuel spray pattern of this nozzle 40a passes in close proximity to the electrodes of the spark plug 42 for prompt ignition as the fuel discharges.

Fuel is supplied to the nozzle 40a by the fuel line 88 as in FIG. 1 and the spark plug is controlled by the electric connection 44 also as in FIG. 1. The nozzle 40a functions as a pilot nozzle for a second or main fuel nozzle 150 as in the aforementioned patent to Gavrun et al. The second fuel nozzle 150 is supplied with fuel by a fuel line 152 from a fuel pump 154 (which may be similar to the pump 82). The actuator cam 156 for the fuel pump 154 is also driven, by a connection schematically indicated at 158, from the engine shaft 18 preferably as shown through the abrupt-change coupling 84, like cam 80 for the fuel pump 82. The timing of the fuel discharge from the second nozzle 150 preferably is no earlier than that of the fuel nozzle 40a, which during spark-ignition operation, functions as a pilot nozzle for the main fuel nozzle 150. Accordingly, it may be desirable to shut off the pilot nozzle 40a at about the same time the ignition circuit to the spark plug 42 is disabled during diesel operation. For this latter purpose a solenoid valve 160 could be provided in the fuel supply line 87 to the fuel pump 82. This solenoid valve 160 could be controlled by the switch 76 for closing this fuel supply valve when the switch 76 closes to disable the ignition circuit. The compound engine of FIG. 6 is otherwise like that illustrated in FIG. 1.

As already stated, the invention is not limited to use of the particular type of turbo-supercharger 50 illustrated. Also, although a specific form of adjustable shaft coupling 84 has been described, it is obvious that other forms of adjustable coupling could be used. Furthermore, the invention clearly is not limited to the specific configuration described of the rotary engine 10. For example, the trochoidal surface 24 could have more than two lobes with the number of apex portions on the rotor increasing correspondingly. Such rotary engine variations are fully described in the aforementioned Wankel et al patent.

It is apparent, therefore, that the invention is not limited to the specific details of construction and arrangement thereof described and changes and modifications may occur to one skilled in the art without departing from the spirit or scope of the invention.

I claim:
1. A compound rotary engine comprising:
   a. an outer body having an internal cavity, the peripheral surface of which has a multi-lobe profile, said outer body also having an air intake passage and a combustion gas exhaust passage;
   b. an inner body of generally polygonal profile mounted for relative rotation within said outer body, the apex portions of said inner body having sealing cooperation with said multi-lobe surface to define a plurality of working chambers which vary in volume in response to said relative rotation, the volumetric compression ratio of said working chambers being substantially less than that required for diesel-type operation;
   c. a fuel nozzle mounted on said outer body for discharging fuel into each working chamber after the air charge therein has been substantially compressed;
   d. ignition means for igniting fuel discharged into each working chamber by said fuel nozzle such that the engine is capable of operating with diesel-type fuels as a spark-ignited engine; and
   e. a supercharger driven by the engine exhaust gases discharging from said exhaust passage for supplying compressed air to said air intake passage, the supercharger output pressure being incapable below a predetermined engine power output, which is significantly above idling output, of raising the compression pressure in said working chamber to a value high enough for diesel-type operation but at higher engine power outputs being capable of raising the compression pressure in said working chambers to a value high enough for diesel-type operation.

2. A compound rotary engine as claimed in claim 1 and including means responsive to the output of said supercharger for disabling said ignition means when the supercharger output exceeds a value which is sufficiently high to raise the compression pressure in said working chambers to a value high enough for diesel-type operation.

3. A compound rotary engine as claimed in claim 2 and including means operable at approximately when said ignition circuit is disabled for producing a substantial advance in the timing of the fuel discharge from said fuel nozzle.

4. A compound rotary engine as claimed in claim 3 and including an engine output shaft coaxial with said outer body and having an eccentric portion on which said inner body is journaled and in which said fuel nozzle timing is advanced at least 5° relative to said shaft when the ignition circuit is disabled.

5. A compound rotary engine as claimed in claim 1 in which said ignition means comprises a plug-type igniter mounted on the outer body adjacent to said fuel nozzle such that the electrode end of said igniter is disposed in a recess in the trochoid surface through which said fuel nozzle discharges and including means for disabling said igniter when the supercharger output is sufficiently high to raise the compression in said working chambers to a value high enough for diesel-type operation.

6. A compound rotary engine as claimed in claim 5 and including means operable for producing a substantial advance in the timing of the fuel discharge from said nozzle when the igniter is disabled.

7. A compound rotary engine as claimed in claim 5 and including a second fuel nozzle mounted on the outer body for discharging additional fuel into each working chamber also after the air charge therein has been substantially compressed.

8. A compound rotary engine as claimed in claim 7 in which said second fuel nozzle discharges at least a portion of its fuel into each working chamber in generally the same region as the fuel discharged from the first nozzle.

9. A compound rotary engine as claimed in claim 7 and including means for stopping fuel discharge from said first nozzle approximately the same time the igniter is disabled.

10. A compound rotary engine as claimed in claim 8 and including means for producing a substantial advance in the timing of the fuel discharge into the engine working chambers when the igniter is disabled.

* * * * *